Patented Nov. 27, 1945

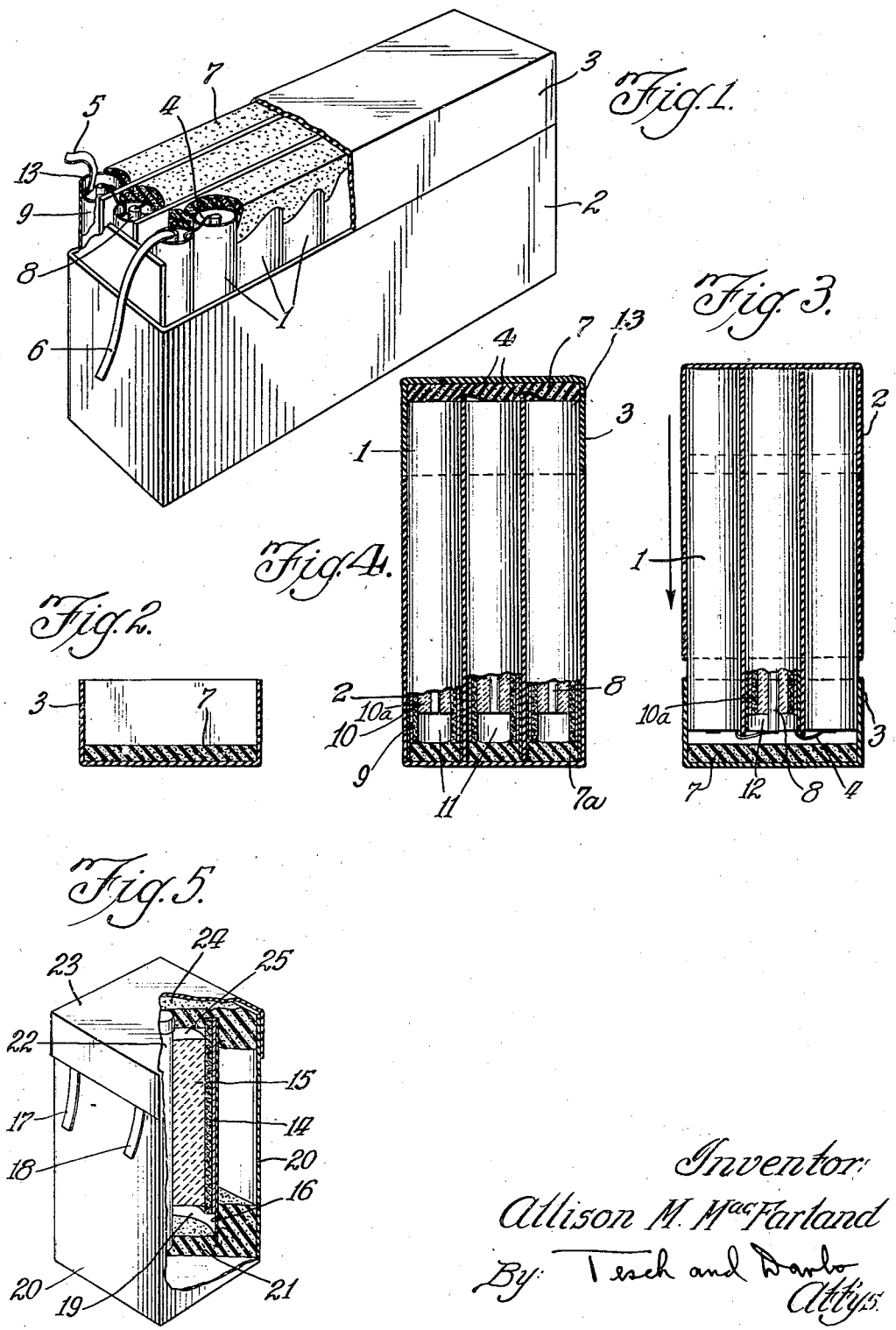

2,389,674

UNITED STATES PATENT OFFICE 2,389,674

METHOD OF MAKING DRY BATTERIES

Allison M. MacFarland, Freeport, Ill., assignor to Burgess Battery Company, Chicago, Ill., a corporation of Delaware Application April 30, 1941, Serial No. 391,109

8 Claims. (Cl. 136—175)

This invention relates to a new method of making dry cells and dry cell batteries and the product thereof and pertains particularly to a method for sealing the cells.

The ordinary dry cell of the cylindrical type consists of a zinc can containing a central carbon rod element which forms one electrode, a depolarizing mass between the carbon and the zinc and insulated from the latter, and a suitable electrolyte between the depolarizing mass, which is electrically conductive, and the zinc can. The "can" may be provided with an integral metallic bottom or may be a cylinder open at both ends such, for example, as that described in C. F. Burgess Patent No. 2,231,320. The metal can forms the second electrode. It is ordinarily closed at the bottom and open at the top. After the active mass, including the carbon electrode, depolarizing mix, and electrolyte, have been inserted in the can during assembly of the cell, the customary practice is to place a paper washer on the carbon rod to support a seal of wax, pitch, or other thermoplastic or fusible sealing material which closes the open end of the can. A space is left between the depolarizing mass and the washer to provide an expansion chamber into which gases and liquids formed during operation of the cell may escape. The sealing material is ordinarily poured in fluid condition on to the paper washers, each cell being thus individually provided with a seal.

The principal objects of the invention are to simplify the process of manufacturing dry cells and dry batteries and thereby reduce the cost of the finished article, and to avoid the dangers of using paper washer seal supports, as, for example, the short-circuiting of the cell due to saturation of the paper by electrolyte. This general objective is achieved by eliminating the paper washer and the steps of applying the washer and pouring the sealing material into the cells, a single, simple sealing operation being substituted as hereinafter more fully described. A group of cells may be sealed and joined together into a unitary battery block by means of a single sealing operation. The connecting wires and soldered connections are protected by the same sealing operation.

Further objects of the invention include the provision of a cell which is completely encased within an inert jacket which prevents escape of corrosive materials from the interior of the cell; also, the provision of a cell having an expansion chamber in either end thereof with provision for the relief of pressures which may build up in the expansion chambers.

The many features of advantage in the new method and product disclosed herein will become apparent as the description proceeds.

Fig. 1 is a perspective view, partly in section, of a dry battery constructed in accordance with the present invention;

Figs. 2, 3 and 4 illustrate, in transverse section, the battery of Fig. 1, or parts thereof, in three stages of manufacture, the cells being shown partly in section; and Fig. 5 illustrates, in perspective, partly in section, a single cell unit embodying the invention.

The battery of Fig. 1, shown by way of illustration of a particular embodiment of the invention, is formed from a plurality of dry cells 1 housed within a container formed by trays 2 and 3. These trays are ordinarily of cardboard impregnated with paraffin or other suitable impregnant, this material being customarily used for covering in the battery manufacturing art. The cells 1 are connected in series by means of connecting wires 4, battery leads 5 and 6 being provided for connection of the external circuit with the end cells of the series. The invention, however, is applicable to all batteries, whether of the "A," "B," or "C" type. Thermoplastic or fusible seals 7 and 7a are used to close the ends of the cells, join them together into a firm block, and protect the connecting wires 4 and the soldered connections of these wires with the carbon electrodes 8 of the cells.

Each individual cell 1 comprises an open-ended metal tube 9, generally zinc containing an active mass, indicated generally by the numeral 10, of well-known composition and including the carbon electrode, depolarizing mass, and electrolyte paste 10a. The active masses fill the metal tubes except for small spaces 11 and 12 which are reserved for gas expansion chambers. The individual cells are preferably provided with jackets 13 of inert film material. These jackets are cylindrical in form, snugly envelop the metal tubes 9, and extend slightly beyond the open ends of the tubes. They are preferably composed of a material which is electrically insulating, somewhat elastic in the sense that it may be stretched without rupture, and resistant to the corrosive salts and solutions contained in the active masses of the cells. "Pliofilm," a rubber hydrohalide, rubber, ethyl cellulose, "Parafilm," and polystyrene are suitable materials. The jackets may be applied to the cells in any desired manner, side seams, if any, being sealed so that when the ends of the jackets are sealed there is no way in which corrosive materials may escape from within the jack.

In assembling the battery, the necessary number of unsealed cells are grouped into a block and collectively sealed and joined together by lowering the grouped cells into a shallow body of fluid sealing material, permitting the material to harden, then repeating the process to seal the other ends of the cells. This may be done in several different ways all of which involve the essential feature of lowering the inverted cells into the sealing material as contrasted with the present common practice of pouring the fluid sealing material into the tops of the individual upright cells. The sealing material need not be liquid but should be sufficiently fluid to flow around the cells readily.

In the preferred method, the necessary number of cells are assembled in a suitable form which is adapted to hold them upright and in the form which the battery block will finally assume. Tray 2 may be used for this purpose. The necessary electrical connections are then made between the cells and the battery leads 5 and 6 are soldered at the proper terminal points. The battery block is then inverted and lowered (as indicated by the arrow, Fig. 3) into cover tray 3 which contains a shallow body of fluid sealing material 7 as shown in Fig. 2. This operation is illustrated in Fig. 3. Leads 5 and 6 are brought out as the wired ends of the cells enter tray 3 to be available for connection to the battery terminal posts, not shown. Any suitable sealing material may be used, although it is preferable, for the reasons hereinafter stated, to use a substance which will remain somewhat plastic at normal temperatures at which the battery is to be operated. The sealing material 7 is hot and therefore relatively fluid when the battery block is lowered into it. As the cells enter the body of sealing material, it is forced up around and between the cells. This results from the displacement of the material by the cells, since the sealing material extends into the interior of the cells only slightly because of the air pressure in the spaces at the ends of the cells which are completely closed upon engagement of the ends of the jackets with the sealing material. In this way, the seal is caused to rise around the cells to a point determined by the original depth of the body of thermoplastic material and the depth of immersion of the cell block into it.

Following this sealing operation, the sealing material is permitted to cool and the partly sealed battery, from which the temporary form 2 has been removed, may be inverted and lowered into tray 2 into which has been poured a quantity of fluid sealing material 7a. This step is illustrated in Fig. 4. The battery is now completely sealed and covered. When the sealing material has completely cooled, the battery is solid and stiff. There is no opportunity for air pockets or bubbles to form in the sealing material or between it and the cover trays. Outer surfaces are smooth and cemented to the seal. The individual cells are completely closed. Leads 5 and 6 may be brought out between the cover trays of the battery where they will be available for the application of suitable terminal posts or clips. The joint between trays 2 and 3 may be sealed with a suitable gummed tape, if desired. The battery may, of course, be further covered or labeled as desired.

In alternative methods for assembling the battery, the battery may be sealed by dipping the unsealed cells into bodies of fluid sealing material contained in thin paper liners supported by suitable forms, the paper either being removed or allowed to remain in place before the battery is placed in an outer covering; or, the individual cells may be assembled in the first instance in a tray which is to form a part of the permanent covering and which contains the sealing material. In the latter case, the tray should be kept on a hot surface until all the cells have been placed in the form. The sealing would then be completed after the cells had been connected together by lowering the top portion into the second cover tray containing fluid sealing material.

As above indicated, the entrapped air at the ends of the cells provide expansion chambers in the finished product. If the cell jackets terminate at the ends of the tubes, or only very slightly beyond, the sealing material will reach at least the ends of the tubes so that the expansion chambers are entirely within the tubes. If, however, the jackets extend a substantial distance beyond the ends of the tubes, say ⅛ to ₁⁄₁₆ inches, the greater part of the expansion chambers may be within the jacket extension and beyond the ends of the tubes. If a sealing material which remains somewhat plastic at normal temperatures is used and if the jacket material is elastic, a means is provided for the relief of excessive pressures which may occur in the expansion chambers during unusually heavy electrical drain periods. Both the plastic sealing material and the jacket will give, as a result of the force of the gas pressure, so that the gases may escape between the metal tube and the jacket into spaces between the cells formed by the stretching of the jackets along the mid-portions of the cells. Considerable volumes of gases may be accommodated in this way without rupturing the protective cell casings.

A single cell embodiment of the invention is illustrated in Fig. 5. This unit may be assembled in a manner similar to that above described. The cell comprises a metal tube 14 containing an active mass 15 and covered by a jacket 16 of inert film material. As indicated in the drawing, jacket 16 extends a considerable distance beyond the end of can 14. Leads 17 and 18 connect with the two electrodes of the cell. An expansion chamber 19 is provided within the portion of jacket 16 which extends beyond the metal tube of the cell when the cell is lowered into a box 20 which contains a small amount of fluid sealing material 21. The carbon 22 of the cell is preferably of sufficient length to cause it to extend into the sealing material to thereby strengthen the cell. The unit is completed by inserting it in inverted position into a cover 23 which also contains a suitable amount of fluid sealing material 24. A second expansion chamber 25 is thus provided and the unit is complete.

Because of the extension of jacket 16 beyond the lower end of metal tube 14 of the cell, the sealing material 21 seals the bottom of the cell by closing the open end of the jacket. The seal does not reach the tube. As pointed out above, this arrangement permits gases to escape from expansion chamber 19 between tube 14 and jacket 16 into the space between the cell and outer box 20 as the jacket is stretched.

In addition to the economies in manufacture resulting from the present invention, many other advantages are evident. The carbon electrodes are not disturbed by the sealing operation, whereas the application of a relatively stiff paper washer in prior practices may cause a shifting of the carbon and consequent impairment of electrical contact with the depolarizing material. The invention is applicable to the sealing of cells having cans with integral metal bottoms although such cells are not illustrated in the drawing. Such cells need not be similarly oriented in the battery block; that is, part of the cells may open at the top of the block while others may be inverted and open downwardly.

I claim:

1. The method of sealing dry cells of the type including a metal tube having at least one end open and concurrently forming an expansion chamber at an open end of the tube, said tube having a jacket of elastic inert film material around the tube and extending beyond the open end of said tube, said method comprising lowering the jacketed cell with the open end of the tube foremost into a body of fluid sealing material until the end of the jacket is submerged therein.

2. The method of sealing dry cells of the type including a metal tube having at least one end open and concurrently forming an expansion chamber at an open end of the tube, said tube having a jacket of elastic inert film material around the tube and extending beyond the open end of said tube, said method comprising lowering the jacketed cell with the open end of the tube foremost into a body of fluid sealing material until substantially all of that portion of the jacket which extends beyond the end of the tube is submerged therein.

3. The method of sealing dry cells of the type including a metal tube having at least one end open and concurrently forming an expansion chamber at an open end of the tube, said tube having a jacket of elastic inert film material around the tube and extending beyond the open end of said tube, said method comprising lowering the jacketed cell with the open end of the tube foremost into a body of fluid sealing material until all of that portion of the jacket which extends beyond the end of the tube and at least a part of that portion of the jacket which is around the tube is submerged in the sealing material, said sealing material having a normally plastic consistency.

4. The method of making a dry battery from a plurality of dry cells having at least one end thereof unsealed and having jackets which extend beyond the metal tubes of the cells at the unsealed ends; said method comprising the steps of assembling the cells into a battery block and thereafter lowering said block, unsealed ends of cells foremost, into a shallow body of fluid sealing material until at least the ends of the projecting jackets are submerged in the material.

5. The method of making a dry battery from a plurality of dry cells having at least one end thereof unsealed and having jackets which extend beyond the metal tube of the cells at the unsealed end, said method comprising the steps of assembling the cells into a battery block and thereafter lowering said block, unsealed ends of cells foremost, into a shallow body of fluid sealing material confined in a tray until the material is caused to rise around said cells at least to the level of the ends of the tubes of the cells, and thereafter permitting the sealing material to harden to a normal plastic consistency.

6. The method of sealing dry cells of the type including a metal tube and concurrently forming an expansion chamber at an open end of the tube, said tube having a jacket of elastic inert film material therearound and extending beyond the open end of said tube, said method comprising lowering the jacketed cell with the open end of the tube foremost into a body of fluid sealing material to such an extent that the sealing material enters the open end of said jacket but does not reach said tube.

7. The method of sealing a dry cell of the type including a cylindrical metal tube having an open end comprising wrapping the cell with an elastic inert film material to form a cylindrical jacket extending to an open end beyond the open end of said tube, sealing the walls of said jacket to render them substantially liquid-tight, sealing the open end of said jacket by lowering the jacketed cell with the open end of the jacket foremost into a body of fluid sealing material until the end of the jacket is submerged therein, and allowing said sealing material to harden.

8. The method of sealing a dry cell of the type including a cylindrical metal tube having an open end comprising wrapping the cell with an elastic inert film material to form a cylindrical jacket extending to an open end beyond the open end of said tube, sealing the walls of said jacket to render them substantially liquid-tight, sealing the open end of said jacket by lowering the jacketed cell with the open end of the jacket foremost into a body of fluid sealing material to such an extent that the sealing material enters the open end of said jacket but does not reach said tube, and allowing said sealing material to harden.

ALLISON M. MACFARLAND.